Patented Jan. 18, 1949

2,459,433

UNITED STATES PATENT OFFICE 2,459,433

SEPARATION OF CINEOLES FROM HYDROCARBONS OF SIMILAR BOILING RANGE BY AZEOTROPIC DISTILLATION WITH PHENOLS

Harold E. Johnson, Wilmington, and Harold M. Spurlin, Marshallton, Del., assignors to Hercules Powder Company, Wilmington, Del., a corporation of Delaware No Drawing. Application February 6, 1947, Serial No. 726,958

3 Claims. (Cl. 202—42)

1

This invention relates to a process for separating the cineole and hydrocarbon constituents of a mixture containing cineoles and hydrocarbons of similar boiling range and, more particularly, to a process of separating such constituents by fractional azeotropic distillation.

In commercial processes for the production of cineoles, a mixture of hydrocarbons, mainly terpenes, also is usually formed concurrently with the cineoles, resulting in a product containing both hydrocarbons and cineoles. The presence of these hydrocarbons, which as a mixture range in boiling point from about 172° to 190° C., complicates isolation of the pure cineoles since the latter have boiling points within the hydrocarbon range. 1,4-Cineole has a boiling point of about 171–2° C. and 1,8-cineole of about 174–5° C., consequently conventional fractional distillation procedures have not been successful in efficiently separating the cineoles from the components of the mixture of hydrocarbons. Various methods have been proposed, however, for effecting the separation of cineoles and hydrocarbons of similar boiling range, and the more successful methods have involved distillation of a cineole-hydrocarbon mixture in the presence of certain cresols. The cineoles form stable complexes with the m- and p-cresols at low temperatures and pressures, and it therefore has been possible by maintaining sufficiently low temperatures and pressures to distill off the more volatile hydrocarbons. These methods have been somewhat disadvantageous, however, due to the fact that atmospheric pressures could not be utilized. At atmospheric pressures and the concurrently higher temperatures necessary to distill the hydrocarbons the cineole-cresol complexes are not stable, consequently the cineoles are not prevented from distilling with the hydrocarbons. These methods also have been disadvantageous in not being able to use phenol as the complex-forming agent, the boiling point of phenol being too close to that of any of the cineoles and hydrocarbons to permit formation of stable complexes with the cineoles.

Now in accordance with this invention, it has been found that phenol may be utilized to separate the cineole and hydrocarbon constituents of a mixture containing cineoles and hydrocarbons of similar boiling range by subjecting the mixture of cineoles and hydrocarbons to fractional azeotropic distillation in the presence of

2 phenol as the azeotropic agent. In contrast with previous processes, which have not used a phenolic compound such as phenol to form constant boiling azeotropic mixtures, phenol is used in the process in accordance with this invention for the purpose of forming constant boiling mixtures with the cineoles and the hydrocarbons contained in a mixture composed of the cineoles and hydrocarbons of similar boiling range. It also has been found in accordance with this invention that the azeotropic mixtures which phenol forms with 1,4-cineole, 1,8-cineole, and the hydrocarbons of similar boiling range may be separated into their individual components by subjecting each azeotropic mixture to fractional steam distillation.

In carrying out the process in accordance with this invention, phenol and a cineole-hydrocarbon mixture in which the cineole content may be, for example, about 55%, are charged into a heating pot fitted with a packed column having about 75 theoretical plates. The reaction mixture then is heated to distillation temperatures and fractional distillation carried out. This results in the separation of three main azeotropic mixtures; namely, hydrocarbon-phenol, 1,4-cineole-phenol, and 1,8-cineole-phenol, the hydrocarbons forming minimum boiling azeotropes with the phenol and the cineoles forming maximum boiling azeotropes with the phenol. In the case of the maximum boiling cineole-phenol azeotropes, the 1,8-cineole-phenol azeotrope boils higher than does the 1,4-cineole-phenol azeotrope. Following separation of the individual hydrocarbon-phenol, 1,4-cineole-phenol and 1,8-cineole-phenol azeotropes, each is subjected to fractional steam distillation for the purpose of recovering the hydrocarbons, the 1,4-cineole, and the 1,8-cineole, respectively.

The following examples constitute specific embodiments of the process in accordance with this invention. All parts are parts by weight.

Example 1

To a heating pot fitted with a 75-plate packed column was charged 1516 parts of phenol. The phenol was distilled to a constant temperature of 120.1° C. at an absolute pressure of 100 mm. of mercury, then there were added to the heating pot 2364 parts of a cineole-hydrocarbon mixture in which the cineole content was 55%, and an additional 1240 parts of phenol. Normally, both the cineole-hydrocarbon mixture and the total amount of phenol may be initially added together, but in the present case the vapor temperature of the phenol was used as a basis for determining the existence of maximum boiling azeotropes. The combined phenol-cineole-hydrocarbon mixture then was distilled batchwise at a reflux ratio of approximately 75 to 1, and 0.5% fractions were removed as overhead product throughout the course of the distillation. The pressure was maintained at 100 mm., and the throughput was maintained at a constant pressure drop of 15 mm. of mercury.

The various 0.5% hydrocarbon-phenol fractions boiled over a range of 83.6° to 110° C. at a pressure of 100 mm., and when combined on the basis of boiling point and refractive index represented a total fraction of 1460.3 parts. Likewise, the 1,4-cineole-phenol azeotrope fractions boiled over a range of 119.3° to 120° C. at a pressure of 100 mm. and on combination represented a total fraction of 2039.2 parts. The 1,8-cineole-phenol azeotrope fractions boiled over a range of 121° to 121.2° C. at a pressure of 100 mm. and on combination represented a total fraction of 1359.2 parts. The residue remaining in the heating pot amounted to 148 parts and that remaining in the column amounted to 43 parts, the total residue constituting 3.8% of the total charge. A distillation loss of 0.6% was incurred during the distillation.

*Example 2*

Following the general procedure utilized in Example 1, 1001 parts of the cineole-hydrocarbon mixture of Example 1 and 600 parts of phenol were charged to the heating pot and fractionally distilled. A reflux ratio of 75 to 1 was used, the column pressure was maintained at 100 mm. and the throughput was maintained at a constant pressure drop of 10 mm. of mercury. Through the course of the distillation 1.5% fractions were removed as overhead product. The fractions were recombined on the basis of boiling point and refractive index. Since the amount of phenol utilized was sufficient to remove completely as their azeotropes the hydrocarbons and the 1,8-cineole, but insufficient to remove completely as its azeotrope the 1,4-cineole, the four fractions collected constituted the hydrocarbon-phenol azeotrope, 1,4-cineole, the 1,4-cineole-phenol azeotrope, and the 1,8-cineole-phenol azeotrope. The hydrocarbon-phenol azeotrope distilled over a range of 88° to 105° C. at 100 mm. and represented 268.0 parts. The 1,4-cineole fraction distilled between 105° and 106° C. at 100 mm. and represented 467.8 parts. The 1,4-cineole-phenol azeotrope distilled between 118° and 119° C. at 100 mm. and represented 338.4 parts. The 1,8-cineole-phenol azeotrope fractions distilled over a temperature range of 119° to 121° C. at 100 mm. and constituted 468.4 parts. A total of 43 parts residue was collected from the heating pot and column and represented 3.2% of the total charge. A distillation loss of 0.9% was incurred.

*Example 3*

To a heating pot fitted with a 20-plate column containing an automatic separatory head was charged 424 parts of the 1,8-cineole-phenol azeotrope obtained in Example 2. The cineole-phenol azeotrope contained in the heating pot was subjected to steam distillation at atmospheric pressure, the temperature being 97° C. During the distillation the water condensate in the separatory head was kept at total reflux and the 1,8-cineole layer was distilled at a reflux ratio of approximately 13 to 1. There was recovered 136.7 parts of 1,8-cineole which had a refractive index of 1.4573 at 20° C. and was essentially 100% pure. The 1,8-cineole had a boiling point of 107.9° C. at 100 mm., a density of 0.92584 at 20° C., and a congealing point of 1.5° C. By calculation from ultraviolet absorption analysis 33% of the 1,8-cineole-phenol azeotrope was 1,8-cineole. On this basis 97.7% of the 1,8-cineole estimated to be in the phenol azeotrope was recovered.

*Example 4*

Following the procedure of Example 3, 744 parts of the 1,4-cineole-phenol azeotrope obtained in Example 1 was fractionally steam distilled at atmospheric pressure, the temperature being 98° C. Throughout the distillation approximately 1.5% fractions of 1,4-cineole were removed overhead. These fractions had a constant refractive index of 1.4446 at 20° C. and on being combined amounted to 415.3 parts. As indicated by ultraviolet absorption analysis for the amount of 1,4-cineole in the 1,4-cineole-phenol azeotrope, this represented a 97.7% recovery of 1,4-cineole. The 1,4-cineole had a boiling point of 105.1° to 105.3° C. at 100 mm., a density of 0.90075 at 20° C. and an approximate congealing point of —46.2° C.

Although the process in accordance with this invention has been illustrated by the examples in connection with a cineole-hydrocarbon mixture containing 55% cineoles, the amount of cineoles in relation to the hydrocarbons may be varied considerably. The process may be utilized with any cineole-hydrocarbon mixture, but it generally is more applicable to cineole-hydrocarbon mixtures containing from about 15 to about 90% total cineoles. From practical considerations the range of cineole content should be from about 50 to about 75%. Also, although the cineole-hydrocarbon mixture used in the examples contained both 1,4-cineole and 1,8-cineole, the process is operable with cineole-hydrocarbon mixtures containing only one of the cineoles. Such mixtures are obtained, for example, by the partial dehydration of either 1,4-terpin or 1,8-terpin for the purpose of obtaining 1,4-cineole or 1,8-cineole, respectively.

In carrying out the fractional azeotropic distillation of this invention, Examples 1 and 2 have shown the use of about 1.2 parts and about 0.6 part, respectively, of the azeotropic agent, phenol, per part of the cineole-hydrocarbon mixture. In general, however, the parts by weight ratio of phenol to the mixture containing cineoles and hydrocarbons of similar boiling range may be from about 0.3:1 to about 4:1. A desirable range upon this basis is from about 0.3:1 to about 0.6:1, preferably from about 0.3:1 to about 0.5:1, in case it is desired to effect the type of separation shown in Example 2. In this example there was sufficient phenol to remove completely as constant boiling azeotropes the hydrocarbons and the 1,8-cineole, but insufficient phenol to remove completely as its azeotrope the 1,4-cineole. The latter was therefore permitted to distill partially as its azeotrope and partially as free 1,4-cineole. It is possible by decreasing further the amount of phenol used in Example 2 to separate the 1,4-cineole only as free 1,4-cineole. This generally may be accomplished by using a weight ratio of phenol to the cineole-hydrocarbon mixture in the range of about 0.3:1 to about 0.5:1. Operation of such a process depends upon the fact that 1,4-cineole forms a more unstable azeotrope with phenol than does 1,8-cineole, and that in the presence of a relatively insufficient amount of phenol will not form a phenol azeotrope. This modification of the process effects a saving in the amount of phenol necessary and is advantageous for obtaining pure 1,8-cineole since a wide temperature differential is established between the boiling point of the 1,8-cineole-phenol azeotrope and the boiling points of the hydrocarbon-phenol azeotrope and of 1,4-cineole.

In case, as in Example 1, however, it is desired to distill both of the cineoles as well as the hydrocarbons in the form of their respective azeotropes with phenol, the parts by weight ratio of phenol to the mixture containing cineoles and hydrocarbons of similar boiling range should be from about 1.2:1 to about 4:1, a preferable range in this instance being from about 3:1 to about 4:1. With this amount of phenol there is an effective working temperature differential of about 10 to 15° C. between the minimum boiling hydrocarbon-phenol azeotrope and the maximum boiling cineole-phenol azeotropes, and there also is an operating temperature differential of about 1.2° C. between the two cineole-phenol azeotropes. Although the temperature differential between the two cineole-phenol azeotropes is rather small, this is compensated by the difference in percent composition of the two azeotropes. Since the 1,4-cineole-phenol azeotrope contains approximately 50% 1,4-cineole and the 1,8-cineole-phenol azeotrope contains about 33% 1,8-cineole, complete separation of the two azeotropes is possible in an efficient column operating at a temperature differential of 1.2° C. Columns having about 75 to about 200 theoretical plates are satisfactory, particularly when operated at a reflux ratio between about 75:1 to about 150:1, preferably between about 75:1 to about 90:1.

In the examples the azeotropic distillations with phenol were carried out at an absolute pressure of 100 mm. of mercury. The process in accordance with this invention, however, is operable at atmospheric pressures and, in general, the azeotropic distillation may be carried out between about 30 and about 760 mm. of mercury. A preferable range is between about 75 and about 250 mm. of mercury, and a particularly applicable range is between about 100 and about 200 mm. of mercury.

As shown in Examples 3 and 4 the cineole-phenol azeotropes may be broken by subjecting them to fractional steam distillation. Such a process also may be utilized to separate the components of the hydrocarbon-phenol azeotrope. In the fractional steam distillation of the 1,8-cineole-phenol azeotrope, for example, there is formed an azeotropic distillate composed of water, phenol, and 1,8-cineole. In the fractionating column, which is equipped with an automatic separatory head adapted to separate the 1,8-cineole and water phases and return the latter downward through the column to the distillation pot, as the cineole-water-phenol azeotrope ascends, the phenol is extracted from the azeotrope and washed down the column by the hot water returning from the separatory head. Following extraction of the phenol, the residual mixture of water and 1,8-cineole ascends the column and is separated into its components in the separatory head, the 1,8-cineole being withdrawn under partial or total takeoff, substantially free of phenol. The fractional steam distillation is likewise applicable to breaking the 1,4-cineole-phenol and hydrocarbon-phenol azeotropes. Examples 3 and 4 have shown the use in the steam distillation step of a fractionating column having 20 theoretical plates, but columns having up to 50 theoretical plates may advantageously be used. These columns should be operated at a minimum reflux ratio of about 13:1 relative to the oil layer, since lower ratios result in isolation of an impure product. A higher reflux ratio, although it may be utilized, is not necessary, since a pure produce is obtained under the minimum reflux ratio conditions.

The process in accordance with this invention is advantageous in that it permits a ready separation of 1,4-cineole and 1,8-cineole from hydrocarbons of similar boiling range and also permits effective separation of the two cineoles from each other. The cineoles recovered according to the process of this invention are of a higher state of purity than it has been possible to obtain by previous processes. In contrast to prior methods for effecting separation of cineoles from hydrocarbons of similar boiling range, the present process may be operated at atmospheric pressures and the concurrently higher temperatures. The process is unique in that only two stages of fractionation are required to obtain pure cineoles. First, the hydrocarbon and cineole azeotropes are fractionated in an efficient column and, second, the resulting phenol azeotropes are broken by fractional steam distillation, resulting in the recovery of individual fractions of pure 1,4-cineole, 1,8-cineole and hydrocarbons. The cineoles obtained by the present process conform to U. S. P. specifications and are therefore indicative of the commercial merit of the process.

The method of separating cineole in the form of a cineole-phenol azeotrope from a cineole-hydrocarbon mixture disclosed in this specification but not claimed herein is claimed in application, Serial No. 45,443, filed August 20, 1948, by Harold E. Johnson.

What we claim and desire to protect by Letters Patent is:

1. The process of separating the cineole and hydrocarbon constituents of a mixture containing cineoles and hydrocarbons of similar boiling range which comprises subjecting said mixture to fractional azeotropic distillation in the presence of phenol as the azeotropic agent, recovering hydrocarbon-phenol and cineole-phenol azeotropes as separate fractions, and subjecting each individual azeotrope to fractional steam distillation with water reflux.

2. The process of separating the cineole and hydrocarbon constituents of a mixture containing 1,4-cineole, 1,8-cineole and hydrocarbons of similar boiling range which comprises subjecting said mixture to fractional azeotropic distillation in the presence of phenol as the azeotropic agent, the weight ratio of phenol to said mixture being from about 0.3:1 to about 0.5:1, recovering as separate fractions the hydrocarbon-phenol azeotrope, 1,4-cineole, and the 1,8-cineole-phenol azeotrope, and subjecting the hydrocarbon-phenol and 1,8-cineole-phenol azeotropes each individually to fractional steam distillation with water reflux.

3. The process of separating the cineole and hydrocarbon constituents of a mixture containing 1,4-cineole, 1,8-cineole and hydrocarbons of similar boiling range which comprises subjecting said mixture to fractional azeotropic distillation in the presence of phenol as the azeotropic agent, the weight ratio of phenol to said mixture being from about 3:1 to about 4:1, recovering as separate fractions the hydrocarbon-phenol, 1,4-cineole-phenol and 1,8-cineole-phenol azeotropes, and subjecting said azeotropes each individually to fractional steam distillation with water reflux.

HAROLD E. JOHNSON.
HAROLD M. SPURLIN.

REFERENCES CITED

The following references are of record in the file of this patent:

UNITED STATES PATENTS

| Number | Name | Date |
|---|---|---|
| 2,090,062 | Bibb | Aug. 24, 1937 |
| 2,315,986 | Scrutchfield | Apr. 6, 1943 |
| 2,353,319 | Sheffield | July 11, 1944 |